US012602011B2

(12) United States Patent
Huot-Marchand et al.

(10) Patent No.: US 12,602,011 B2
(45) Date of Patent: Apr. 14, 2026

(54) TIMEPIECE COMPRISING AN EXTERNAL ELEMENT

(71) Applicant: ETA SA Manufacture Horlogère Suisse, Grenchen (CH)

(72) Inventors: Sylvain Huot-Marchand, Eschert (CH); Dominique Dubugnon, Saint-Prex (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 277 days.

(21) Appl. No.: 18/502,195

(22) Filed: Nov. 6, 2023

(65) Prior Publication Data

US 2024/0210880 A1 Jun. 27, 2024

(30) Foreign Application Priority Data

Dec. 22, 2022 (EP) .................................... 22215938

(51) Int. Cl.
*G04B 19/30* (2006.01)
*G04C 10/02* (2006.01)

(52) U.S. Cl.
CPC ............. *G04B 19/30* (2013.01); *G04C 10/02* (2013.01)

(58) Field of Classification Search
CPC .... G04B 19/30; G04B 19/32; G04B 45/0015; G04B 45/0076; G04C 10/02; G04G 17/02; G04G 19/00; G04G 9/0041; H02J 7/35
See application file for complete search history.

(56) References Cited

U.S. PATENT DOCUMENTS 3,757,511 A * 9/1973 Burgess ................ G01J 1/4204 257/E27.128
8,169,858 B2 * 5/2012 Klopfenstein ......... G04B 19/32 368/227

(Continued)

FOREIGN PATENT DOCUMENTS

EP 2 290 478 A1 3/2011
EP 3 588 203 A1 1/2020

(Continued)

OTHER PUBLICATIONS

Japanese Office Action issued Sep. 3, 2024, in Japanese Patent Application No. 2023-186556 (with English Translation), 13 pages.

(Continued)

*Primary Examiner* — Edwin A. Leon
(74) *Attorney, Agent, or Firm* — Oblon, McClelland, Maier & Neustadt, L.L.P.

(57) ABSTRACT

A timepiece including at least one external timepiece element including a visible face formed of at least a first opaque part and at least a second transparent or translucent part, the at least one external timepiece element including an autonomous lighting device including the following functional elements: at least one light source capable of generating a light in the visible face of the external timepiece element; a self-contained power supply unit; and a control unit configured to manage the operation of the light source; the at least one external timepiece element being formed by an assembly of a plurality of stacked layers connected together and each including one or more functional elements of the autonomous lighting device.

12 Claims, 3 Drawing Sheets

(56) References Cited

U.S. PATENT DOCUMENTS

| | | | | |
|---|---|---|---|---|
| 8,787,120 | B2 * | 7/2014 | Fleury .................... | G04B 19/30<br>368/232 |
| 2012/0120776 | A1 | 5/2012 | Fleury et al. | |
| 2014/0301168 | A1 | 10/2014 | Fleury et al. | |
| 2016/0161920 | A1 | 6/2016 | Fujisawa et al. | |
| 2019/0391535 | A1 | 12/2019 | Berner et al. | |
| 2022/0390900 | A1 | 12/2022 | Willemin et al. | |

FOREIGN PATENT DOCUMENTS

| | | | |
|---|---|---|---|
| JP | 2013-503327 | A | 1/2013 |
| JP | 2016-109522 | A | 6/2016 |
| JP | 2018-194310 | A | 12/2018 |
| JP | 2021-110728 | A | 8/2021 |
| JP | 2022-172093 | A | 11/2022 |
| JP | 2022-187992 | A | 12/2022 |

OTHER PUBLICATIONS

Japanese Office Action issued Dec. 17, 20224 in Japanese Patent Application No. 2023-186556, 5 pgs.

European Search Report issued May 17, 2023 in European Application 22215938.6 filed on Dec. 22, 2022, 3 pages (with English Translation of Categories of Cited Documents).

* cited by examiner

TIMEPIECE COMPRISING AN EXTERNAL ELEMENT

CROSS-REFERENCE TO RELATED APPLICATION

This application claims priority to European Patent Application No. 22215938.6 filed on Dec. 22, 2022, the entire disclosure of which is hereby incorporated herein by reference.

TECHNICAL FIELD OF THE INVENTION

The present invention relates to a timepiece comprising at least one external timepiece element equipped with a completely autonomous lighting device. More specifically, the present invention relates to a timepiece featuring original lighting effects, for functional, aesthetic and/or entertainment purposes.

TECHNOLOGICAL BACKGROUND

Creating timepieces such as wristwatches with an improved aesthetic appearance is a constant concern for watch manufacturers and in particular for those responsible for designing the various external elements. It would take too long to list here all the solutions that have been considered to give a timepiece as neat and aesthetically pleasing an appearance as possible. Examples include the engine-turning technique used on dials, the shape and/or colour of dial appliques or hands, and the addition of precious or semi-precious stones.

In this context, it is understood that there is a need to find a solution that does not have the drawbacks of the prior art and that aims to offer customers watches with an appearance that is aesthetic, surprising and functional.

SUMMARY OF THE INVENTION

The invention overcomes the drawbacks of the prior art by providing a timepiece that allows light to escape from the inside of an external element of the timepiece with optimum light transmission, while having original lighting effects, for functional, aesthetic and/or entertainment purposes.

To this end, the present invention relates to a timepiece comprising at least one external timepiece element comprising a visible face formed of at least a first opaque part and at least a second transparent or translucent part, said at least one external timepiece element comprising an autonomous lighting device comprising the following functional elements:

- at least one light source capable of generating light in the visible face of the external timepiece element;
- a self-contained power supply unit; and
- a control unit configured to manage the operation of the light source;

said at least one external timepiece element being formed by an assembly of a plurality of stacked layers connected together and each comprising one or more functional elements of the autonomous lighting device.

In other embodiments:

- said at least one external timepiece element comprises a back, a middle, a dial, a bracelet strand, a bezel, a flange, a push-button, a winding button and/or a winding button cap;
- the assembly consists of a first layer forming said visible face comprising said at least one light source;

- said at least one light source is arranged in the first layer, said arrangement being configured so that most or all of the light produced by said at least one light source passes through said at least one second part of the visible face;
- said at least one second transparent or translucent part is configured so that light, in particular light comprising solar radiation that can be received by a photovoltaic module of the self-contained power supply unit, can pass therethrough;
- said at least one light source is a light source configured to produce continuous or quasi-continuous illumination on said at least one second part of the first layer;
- in addition to the first layer, the assembly comprises the following successive layers:
  - a second layer comprising a photovoltaic module constituting the self-contained power supply unit;
  - a third layer comprising an electrical accumulator constituting the self-contained power supply unit;
  - a fourth layer forming a hidden face of the external timepiece element comprising the control unit;
- in addition to the first layer, the assembly comprises the following successive layers:
  - a second layer comprising a photovoltaic module constituting the self-contained power supply unit; and
  - a third layer comprising a hidden face of the external timepiece element comprising the control unit and an electrical accumulator constituting the self-contained power supply unit;
- the first layer is rigid relative to the other layers in the assembly, which are flexible;
- the plurality of layers are joined together by a connecting element so as to unify these layers to obtain an assembly forming a one-piece external timepiece element;
- said at least one first opaque part is a graphic representation included on and/or in a substrate used to help form the visible face;
- the functional elements are printed on substrates making up the layers of the assembly forming said at least one external timepiece element;
- said at least one external timepiece element comprises a back, a middle, a dial, a bracelet strand, a bezel, a flange, a push-button, a winding button and/or a winding button cap.

BRIEF DESCRIPTION OF THE FIGURES

The purposes, advantages and features of the timepiece according to the invention will appear more clearly in the following description which is given on the basis of at least one non-limiting embodiment shown by way of the drawings, in which.

DETAILED DESCRIPTION OF THE INVENTION

Figure 1:
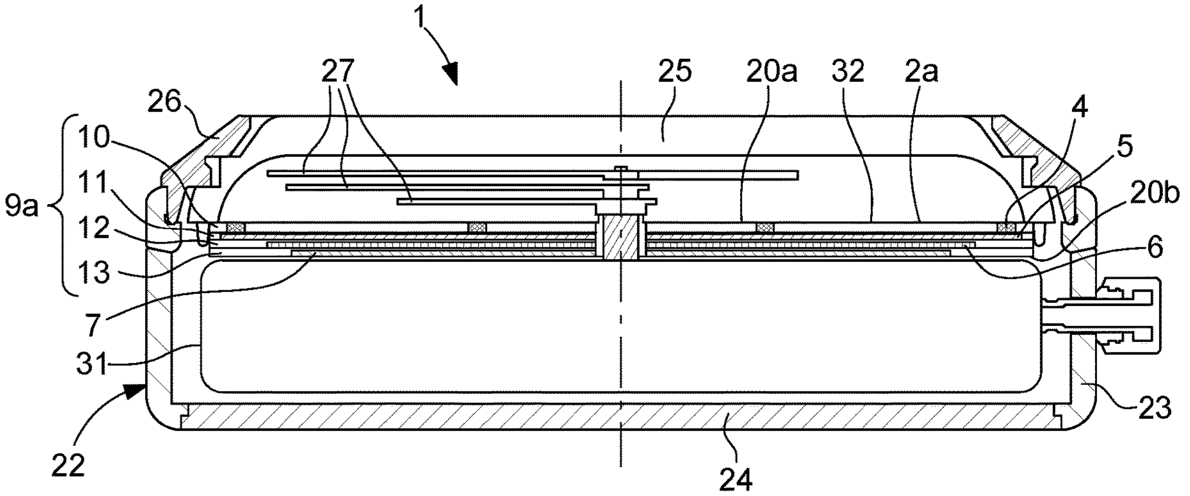
FIG. 1 is a sectional view of a case of the timepiece fitted with an external timepiece element such as a dial provided with an autonomous lighting device according to embodiments of the invention.

The present invention was drawn from the general inventive idea consisting of housing an autonomous lighting device 3 in an external timepiece element 2*a*, 2*b* of a timepiece 1, which external timepiece element 2*a*, 2*b* is provided with a visible face 20*a* comprising at least a first opaque part and at least a second transparent or translucent part.

In this timepiece 1, the external timepiece elements 2*a*, 2*b* correspond to all of the component parts of the timepiece 1 surrounding a movement 31, contributing in particular to the external presentation, protection, fastening and control thereof. These external timepiece elements further give this watch its aesthetic appearance and style, and allow all its functions to be indicated. More specifically and with reference to FIGS. 1 and 2, these component parts considered here include, in a non-exhaustive and non-limiting manner: a back 24, a middle 23, a dial 32, bracelet strands 30, a bezel 26, a flange, a push-button, a hand, a winding button and/or a winding button cap.

Figure 2:
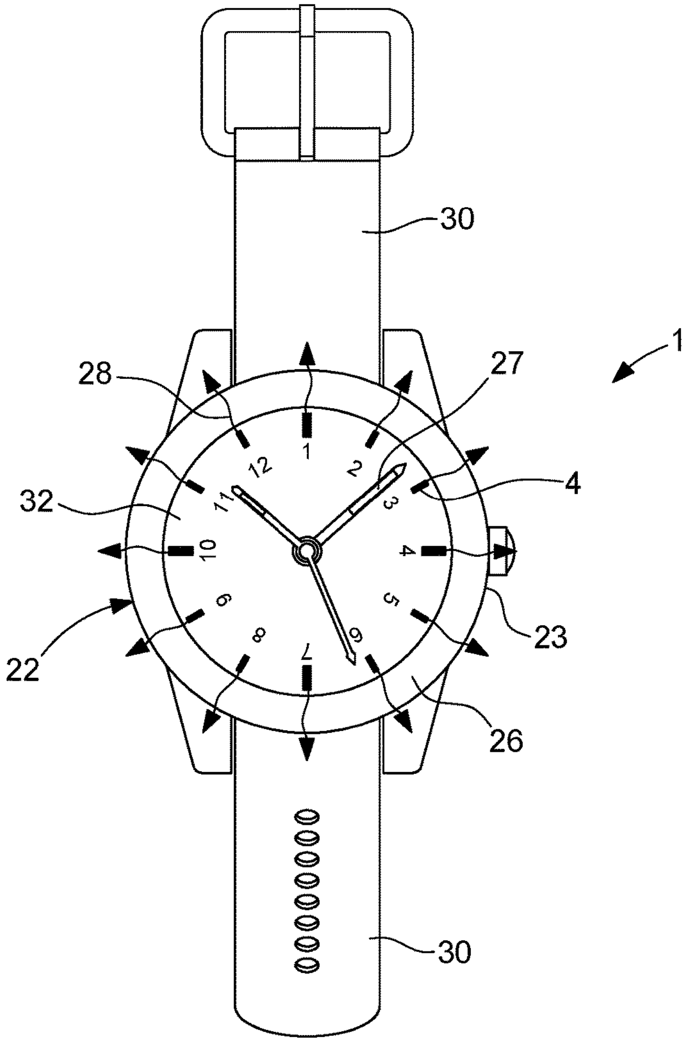
FIG. 2 shows a top view of a watch comprising this dial according to the embodiments of the invention.

In FIGS. 1 and 2, such a timepiece 1 comprises a case 22 provided with the middle 23 to which the back 24 and a crystal 25 are fastened, a set of components forming the horological movement 31, and the dial 32 disposed between the horological movement 31 and the crystal 25.

In this configuration, the horological movement 31 drives, in a manner known to a person skilled in the art, hands 27 comprising an hour hand, a minute hand and optionally a seconds hand. To this end, the dial 32 has a through-hole that receives the arbor of the hands.

As previously mentioned, the external timepiece elements 2*a*, 2*b* relate to all of the components surrounding the movement. For ease of understanding, only the dial will be considered. It should be noted that such an external timepiece element 2*a*, 2*b* thus comprises the visible face 20*a*, which is also referred to as the "visible part" or "visible upper part", and further comprises a hidden face 20*b* otherwise referred to as the "hidden part" or "hidden lower part" of this element 2*a*, 2*b*.

In this context, the external timepiece element 2*a*, 2*b* comprises two faces 20*a*, 20*b*, including:

- the so-called visible face 20*a* visible from the outside of the timepiece 1, also referred to as the "visible part" or "visible upper part", and
- the so-called hidden face 20*b* arranged opposite the horological movement 31 in an enclosure of the case 22 of the timepiece 1, this face 20*b* being otherwise referred to as the "hidden part" or "hidden lower part" of this element 2*a*, 2*b*.

When the external timepiece element 2*a*, 2*b* is a dial 32, it comprises at least one graphic representation such as:

- a reference (or display) element such as, for example, a numeral, an index, a line or even a point contributing, with or without the hands, to the display of a horological information/parameter or a physical information/parameter measured by a sensor or the like included in the movement;
- an inscription, a pattern, a text, a logo, etc.

In the example embodiment of the invention described herein, the horological movement 31 is a mechanical movement. In one alternative embodiment, this movement 31 can be an electronic movement or an electromechanical movement. A timepiece 1 can be referred to herein as mechanical when its movement is mechanical, and as electromechanical or electronic when it comprises electromechanical or electronic movements 31 respectively.

In this external timepiece element 2*a*, 2*b*, this lighting device 3 comprises its own power supply means, as will be seen hereinbelow. Such a lighting device 3 is said to be autonomous in particular relative to the movement 31 of the timepiece 1 and in particular relative to the power source of this movement 31, for example when this source is an electrical power supply as in an electromechanical movement or an electronic movement. Under these conditions, it is understood that the power used by this lighting device 3 is not used to the detriment of the autonomy of the movement 31.

Such a lighting device 3 comprises the following functional elements: at least one light source 4, a power supply unit 21 and a control unit 7.

In this context, the light source 4 is preferably an extended light source which produces continuous or quasi-continuous illumination on the second transparent or translucent part of the considered external timepiece element 2*a*, 2*b* through which light 28 will escape. Such a light source 4 can correspond to any light-emitting element selected from a non-exhaustive and non-limiting list comprising:

- a light-emitting capacitor known by the acronym LEC;
- a light-emitting diode of the LED, OLED (Organic Light-Emitting Diode), AMOLED (Active-Matrix Organic Light-Emitting Diode) or QLED (Quantum Light-emitting Diode) type;
- any light-emitting material activated by a local electric field;
- any light-emitting material activated by an electric current;
- any combination of these light-emitting elements.

In this lighting device 3, the power supply unit 21 comprises an electrical accumulator 6 and a photovoltaic module 5, also referred to as solar cells. This photovoltaic module 5 is connected to the electrical accumulator 6 via connection elements given the reference numerals 17*b* and 18 in FIGS. 4 and 6. This photovoltaic module 5 can comprise one or more unit cells of the heterojunction or multijunction type, connected in parallel or in series. The photovoltaic cells of this module 5 can be made, in a manner known to a person skilled in the art, from semiconductor materials containing copper, indium, gallium and selenium, containing cadmium telluride, containing monocrystalline gallium arsenide or containing monocrystalline or polycrystalline silicon, or perovskites. It should be noted that these examples are not limiting and that a person skilled in the art will be able to find the type of photovoltaic cells suitable for the invention.

It should be noted that said at least one first opaque part and at least one second transparent or translucent part of the visible face of the external timepiece element 2*a*, 2*b* are preferably configured so that light or solar radiation can pass therethrough and supply the photovoltaic module 5 so that the latter can convert the solar energy from this radiation into electrical energy. In particular, the first part can be configured to appear visually opaque, in particular to the human eye, while still allowing such solar radiation to pass therethrough.

In this lighting device 3, the control unit 7, also referred to as a microcontroller, comprises an electronic circuit 8 including hardware resources, in particular at least one processor cooperating with memory elements as well as address, data and control buses. This control unit 7 includes, in its memory elements, an algorithm for managing the illumination of said at least one light source 4. Such an algorithm is executed by the processor of this control unit 7, taking account in particular of data from event sensors included in the lighting device 3 in order to manage the operation of said at least one light source 4.

It should be noted that such data can, for example, provide information relating to events detected by these sensors, said events being likely to contribute to the operation of said at least one light source 4. These events can include, in a non-limiting and non-exhaustive manner: the detection of a particular brightness level in the environment of the timepiece, the detection of a particular sound element or a particular sound level, the detection of a particular visual object, the detection of a movement made by a part of the user's body on which this timepiece 1 is included, etc.

In this context, the event sensor of this autonomous lighting device 3 comprises in particular and in a non-limiting and non-exhaustive manner:

- a brightness sensor to detect the ambient brightness level;
- a motion sensor such as a gyroscopic and/or inertial sensor in the form of an electronic component of the gyroscopic and/or inertial microelectromechanical system circuit type;
- a microphone-type sound sensor, and/or
- an optical sensor of the photographic sensor type.

It should further be noted that this control unit 7 is able to manage/control the operation of the light sources 4 simultaneously and/or in sequence. Moreover, each light source 4 is managed/controlled separately by this control unit. In this context, the management of the operation of each light source 4 can consist, in a non-limiting and non-exhaustive manner, of carrying out the following operations: sequentially switching on or off, or simultaneously switching on or off two or more light sources 4, flashing one or more light sources 4, or defining a flashing frequency for each light source 4, a flashing duration for each light source 4, or a switching on or off duration for each light source 4, etc.

Such a control unit 7 can further include, in its memory elements, an algorithm for managing the electrical accumulator 6, in particular for managing its recharging by the photovoltaic module 5 and for managing the electricity consumption of said light source 4.

Figure 3:
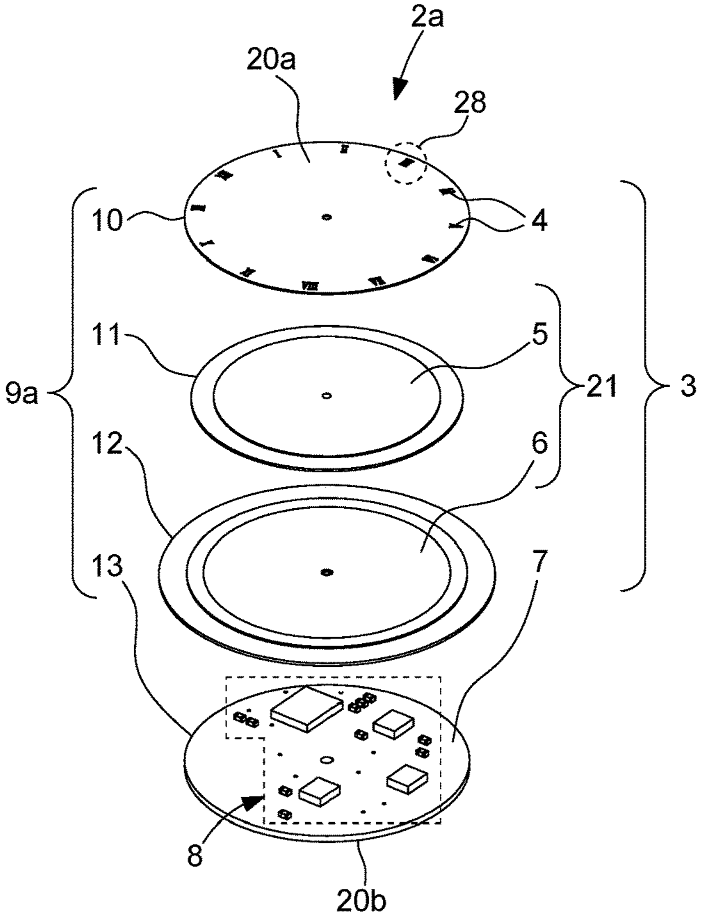
FIG. 3 shows an exploded view of a first alternative embodiment of the assembly of four stacked layers forming said dial provided with the autonomous lighting device, said layers each comprising one or more component elements of the lighting device according to the embodiments of the invention.
Figure 5:
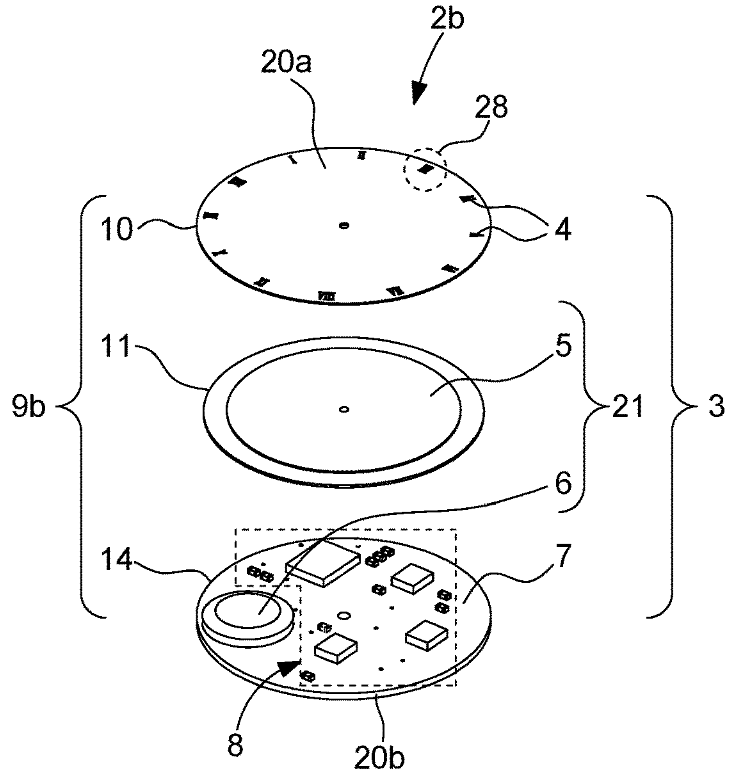
FIG. 5 shows an exploded view of a second alternative embodiment of the assembly comprising three stacked layers forming said dial provided with the autonomous lighting device, said layers each comprising one or more component elements of the lighting device according to the embodiments of the invention.

With reference to FIGS. 1, 3 and 5 and as mentioned above, the autonomous lighting device 3 is thus included in the external timepiece element 2*a*, 2*b*. In this configuration, the functional elements of this lighting device 3, i.e. the light source 4, the electrical accumulator 6, the photovoltaic module 5 and the control unit 7, are included in one or more layers 10, 11, 12, 13, 14 forming the external timepiece element 2*a*, 2*b*.

In other words, the body of this external timepiece element 2*a*, 2*b* is formed by the assembly 9*a*, 9*b* of a plurality of stacked layers 10, 11, 12, 13, 14 connected together and each comprising one or more functional elements of the lighting device 3.

In this assembly 9*a*, 9*b*, the layers 10, 11, 12, 13, 14 are joined together by a joining element such as an adhesive substance so as to unify them in order to obtain a monolithic assembly 9*a*, 9*b* thus forming a one-piece external timepiece element 2*a*, 2*b*. Such layers 10, 11, 12, 13, 14 are stacked in the assembly 9*a*, 9*b*, and are arranged one on top of the other in a defined order.

Thus, such a one-piece external timepiece element 2*a*, 2*b* (e.g.: dial) has the additional advantage of being able to be removably mounted in a case of the timepiece 1, in addition to facilitating its integration into or onto such a case.

More specifically, in first and second alternative embodiments, this assembly 9*a*, 9*b* comprises a first layer 10 forming/constituting a visible face 20*a* of the external timepiece element 2*a*, 2*b*. Such a first layer 10 includes at least one light source 4 of the lighting device 3 of the external timepiece element 2*a*, 2*b*.

This first layer 10 is formed from a substrate which comprises at least a first part which is non-transparent, non-translucent, opaque or substantially opaque, and at least a second part which is transparent, translucent, at least partially transparent or at least partially translucent. It is understood that the second transparent or translucent part constitutes a portion of the external timepiece element 2*a*, 2*b* through which:

- the light 28 produced by said at least one light source 4 can escape to the outside of the external timepiece element 2*a*, 2*b* and thus of the timepiece 1, and
- the light coming from the environment of the timepiece 1 can penetrate the external timepiece element 2*a*, 2*b* in the direction of the photovoltaic module 5 of the lighting device 3, this light comprising solar radiation when it is of natural origin.

This first layer 10 is preferably rigid or semi-rigid in comparison with the other layers 11, 12, 13, 14 of the assembly 9*a*, 9*b*, which are preferably flexible or pliable. It is understood here that such a first layer 10 helps to structurally stiffen the assembly 9*a*, 9*b* of the external timepiece element 2*a*, 2*b*.

This first layer 10 is formed by a transparent, translucent, at least partially transparent or at least partially translucent substrate which is rigid or semi-rigid. Such a substrate is made of a material having a transmittance to solar radiation, in particular to ultraviolet radiation, also known as UVT (acronym for "Ultra-Violet Transmission"), of between 65 and 95 percent. This transmittance is preferably 85 percent. Such a material can be transparent or translucent. This material can be, in a non-limiting and non-exhaustive manner, a polymer, glass or ceramic.

It should be noted that the ceramic here can be zirconia, which is a transparent, translucent, at least partially transparent or at least partially translucent material. This zirconia procures a surprising illumination for the timepiece 1, giving the timepiece a precious appearance and a more or less diffuse, discreet, soft and pleasant illumination, and these features can be varied practically ad infinitum depending on the desired aesthetic result, which increases the final aesthetic quality of the timepiece 1. Moreover, zirconia stabilised in the tetragonal phase by the addition of yttria (Y-TZP, acronym for "yttria-stabilised tetragonal zirconia polycrystals") is the technical ceramic that offers both the best mechanical toughness and one of the best light transmission coefficients. Its use in a timepiece 1 to allow light 28 to escape from the inside of an external element 2*a*, 2*b* of the timepiece 1 thus gives the latter very good light transmission, while allowing for original lighting effects, for functional, aesthetic and/or entertainment purposes.

In this configuration, such a material can undergo a treatment intended to create said at least one first opaque part in and/or on the substrate. This treatment consists, for example, in producing, in the substrate and/or on an upper surface of this substrate, said at least one first non-transparent, non-translucent, opaque or substantially opaque part, intended to be illuminated by the light 28 produced by said at least one light source 4.

When this substrate is made of a material such as ceramic, for example zirconia, the first opaque part can for example be made on this substrate, in a non-limiting and non-exhaustive manner, using:

- a method for selectively carburising and/or nitriding this surface;
- a method for varying the thickness of the substrate by mechanical or laser etching (for example recessing some $10^{th}$ or $100^{th}$ of a millimetre into the ceramic);
- an internal etching method etching into the substrate, in particular by a laser etching process;
- by varying the density of this substrate;
- an opaque or semi-transparent printing method for printing inside or on the lower surface of the substrate (for example in the one or more cavities formed in this lower surface);
- a method for bonding an opaque or semi-transparent coating;
- a physical vapour deposition (PVD) or similar method, patterning on the inside or on the surface of the substrate;
- or a combination of these methods.

Thus, when the light 28 is emitted by the light source, the graphic representation appears by backlight on the visible face 20*a* of the external timepiece element 2*a*, 2*b*.

In one embodiment, the rigid or semi-rigid substrate can be made of a first material constituting said at least one first part and of a second material constituting said at least one second part. In this context, the first material can be made integrally in one piece with the second material, thus making this first layer 10 a one-piece part. It will be understood that this first layer 10 thus consists solely of this said at least one first part and of this said at least one second part. Said at least one first part and said at least one second part preferably extend within the thickness of this substrate, which thickness is defined between upper and lower surfaces of this substrate. By extending in this manner within this thickness, said at least one first part and said at least one second part connect these upper and lower surfaces of the substrate together.

In this version, the first material can be present in the substrate in a greater proportion than the second material. It should be noted that this second material is visually identifiable in the substrate constituting this first layer 10 because it corresponds to said at least one second transparent or translucent part or zone of this first layer 10. It is understood that in this context, the total surface area of the visible face 20*a* of the external timepiece element 2*a*, 2*b* occupied by the one or more first parts is greater than the total surface area of this same face 20*a* occupied by the one or more second part or parts. In this example, some of the second parts can allow the light 28 produced by said at least one light source to pass therethrough, for example by forming reference elements such as indexes when this external timepiece element 2*a*, 2*b* is a dial 32, and another part can allow the light from the environment of the timepiece 1, which can include solar radiation, to pass therethrough. In this version, the first material can make up between 55 and 75% of the body of the external timepiece element 2*a*, 2*b*, preferably 65%.

In another example of this version, there may be a smaller proportion of this first material than of the second material in the substrate of this first layer 10. It is understood that in this context, the total surface area of the visible face 20*a* of the external timepiece element 2*a*, 2*b* occupied by the one or more first parts is less than the total surface area of this same face occupied by the one or more second part or parts. In this example, the one or more first opaque parts can take the form of one or more of the graphic representations mentioned above, whereby each graphic representation can appear by backlight on the visible face 20*a* of the external timepiece element 2*a*, 2*b* when these first parts are illuminated. It should be noted that in this configuration, the first material can thus make up between 20 and 30% of the body of the external timepiece element 2*a*, 2*b*, preferably 25%.

In this first layer 10, at least one light source 4 is arranged in or on a lower surface of the substrate. Such an arrangement of the light source 4 in or on this lower surface is configured to illuminate all or part of the visible face 20*a* of the external timepiece element 2*a*, 2*b*. For example, when this external timepiece element 2*a*, 2*b* is a dial 32, this can involve illuminating a reference (or display) element such as a numeral, an index, a line, a point or illuminating one or more hands, or even illuminating all or part of the surface of the visible face 20*a* of this dial 2*a*, 2*b*.

This lighting can be backlighting or semi-direct lighting when the light source 4 is arranged in a cavity defined in the substrate. Such a cavity can be a blind opening made in the lower surface of this substrate. More specifically, this blind opening is made in:

- the first opaque part in order to help illuminate the graphic representation formed by this first part; and/or
- the second transparent or translucent part for illuminating the first part corresponding to the graphic representation included in the substrate and/or on the upper surface and/or on the lower surface (for example on the bottom of the cavity) of this substrate.

This lighting can be direct lighting when the light source 4 is arranged in the cavity defined in the substrate. Such a cavity can be a blind opening made in the lower surface of this substrate. More specifically, this blind opening is made in the second transparent or translucent part to illuminate this second part forming a small graphic representation such as a reference element for example an index when the external timepiece element 2*a*, 2*b* is a dial 32. This is the case, for example, when the total surface area of the visible face 20*a* of the external timepiece element 2*a*, 2*b* occupied by the one or more first parts is greater than the total surface area of this same face occupied by the one or more second part or parts.

In this configuration, the light radiation 28, or the light 28, produced by this light source 4 can escape to the outside of the external timepiece element 2*a*, 2*b* via said visible face 20*a* of this element 2*a*, 2*b*, thus allowing at least one graphic representation such as a reference element to be viewed in the dark.

This lighting can also be direct lighting when the light source 4 is arranged in a through-opening made in said at least one first part and/or said at least one second part. Such an opening extends through the thickness of the substrate of the first layer 10, opening out at its two ends respectively onto the upper and lower surfaces of this substrate. In this configuration, all or part of the light source 4 can project from the upper surface of this substrate and thus from the visible face 20*a* of this external timepiece element 2*a*, 2*b*. For example, in such a configuration, when the external timepiece element 2*a*, 2*b* is a dial 32, said at least one projecting light source 4 can form a reference element such as an index, a numeral, a point, or a line, etc.

Such lighting can also be indirect lighting when said at least one light source 4 is coupled to at least one waveguide. This waveguide, also referred to as a light guide, allows the light 28 to be conveyed from the point where it is injected into the guide to the substrate or to an area of the substrate (for example a cavity, a through-opening) close to the upper surface of this substrate. Such a light guide can be an optical fibre that allows any obstacles that may appear in the substrate, for example between the light-emitting element and the region of the substrate close to the upper surface of this substrate, through which the light 28 will escape, to be bypassed. In this alternative embodiment, it is thus the light 28 that is carried, via the waveguide, from the light-emitting element to this region of the substrate to be illuminated.

In such a configuration, a first end of the waveguide is coupled to the light source 4 and a second end of this waveguide can be arranged in:

- a cavity which can be a blind opening made in said first and/or second part(s) of the substrate, in the lower surface of this substrate of the first layer 10, or
- a through-opening extending through said first and/or second part(s) included in the thickness of the substrate of the first layer 10, said opening emerging at its two ends respectively onto the upper and lower surfaces of this substrate and thus of the first layer 10. This second end can thus project from the upper surface of the substrate and thus from the visible face 20*a* of the external timepiece element 2*a*, 2*b*. For example, in such a configuration, when the external timepiece element 2*a*, 2*b* is a dial 32, said at least one projecting light source 4 can form a reference element such as an index, a numeral, a point, or a line, etc.

In this context, indirect lighting can be achieved by a single light source 4 included on the lower surface of the substrate of this first layer 10 and coupled to several waveguides, including the second ends when they are arranged in:

- cavities, each emitting light radiation from this light source 4, this radiation escaping to the outside of the external timepiece element 2*a*, 2*b* through its visible face 20*a*, thus allowing at least one graphic representation to be viewed, in particular in the dark, and/or
- through-openings projecting or not projecting from the upper surface of this first layer 10 in order to form graphic representations such as reference elements, and each emitting light radiation from this light source 4.

In this first layer 10, the light source 4 is applied/attached to the lower surface of the substrate of this first layer 10, in a cavity or on an internal wall of an aforementioned through-opening, by printing or evaporation.

Moreover, it should be noted that the lower surface of this first layer 10 can be self-adhesive so that it can contribute to the assembly thereof with the second layer 11.

In the assembly 9*a*, 9*b* forming the external timepiece element 2*a*, 2*b*, the second layer 11 comprises a substrate including the photovoltaic module 5. This substrate is preferably flexible or pliable. Such a substrate can be a film on which this photovoltaic module 5 is arranged, for example, this substrate can be made of a material belonging to the polymer family. Such a photovoltaic module 5 preferably extends over the whole of a so-called active area of an upper surface of this substrate of the second layer 11. This active area is a portion of this upper surface of the substrate which is able to receive the light coming from the lower surface of the first layer 10 of the external timepiece element 2*a*, 2*b*. This light, which has passed through all or part of the first layer 10, comes from the external environment of the external timepiece element 2*a*, 2*b*, and thus of the timepiece 1, in this case mainly from solar radiation when it is of natural origin.

It should be noted that the photovoltaic module 5 is applied to the upper surface of this substrate using inkjet or screen printing processes or using a thermal evaporation printing process. Reference will be made here to a second layer 11 comprising a printed photovoltaic module 5, in particular to a photovoltaic module 5 printed on the substrate of the second layer 11.

Furthermore, it should be noted that once the photovoltaic module 5 has been applied to the substrate, a layer of a self-adhesive or adhesive substance can be deposited on all or part of the upper surface and/or of the lower surface of this substrate. Under these conditions, the second layer 11 can be a self-adhesive layer which helps to facilitate its assembly/mounting/adhesion with the other layers, in particular with the first layer 10 and/or a third layer 12 of this assembly 9*a*, 9*b*.

In this first alternative embodiment, the assembly 9*a* comprises this third layer 12 further comprising a preferably flexible or pliable substrate, comprising the electrical accumulator 6 of the autonomous lighting device 3. This substrate can be a film on which the accumulator 6 is placed. Such a substrate can be made of a material belonging to the polymer family.

This accumulator 6 can be a lithium battery or a semiconductor battery. Such an accumulator 6 is applied to an upper surface of this substrate using processes known in the prior art, such as:

- printing processes on a flexible polymer substrate, for example a lithium battery, or
- three-dimensional printing processes, for example for a semiconductor battery such as a lithium-metal semiconductor battery.

Reference will be made here to a third layer 12 comprising a printed electrical accumulator 6, in particular to an electrical accumulator 6 printed on the substrate of the third layer 12.

Such processes are used to obtain a third layer 12 comprising this accumulator 6 which is flexible and ultra-thin.

Moreover, it should be noted that once the accumulator 5 has been applied to the substrate, a layer of a self-adhesive or adhesive substance can be deposited on all or part of the upper surface and/or of the lower surface of this substrate. Under these conditions, the third layer 12 can be a self-adhesive layer which helps to facilitate its assembly/mounting/adhesion with the other layers, in particular with the second layer 11 and/or a fourth layer 13 of this assembly 9*a*.

It should be noted that this accumulator 6 is used to store the electrical energy produced by the photovoltaic module 5 and to release it on demand to power said at least one light source 4.

Figure 4:
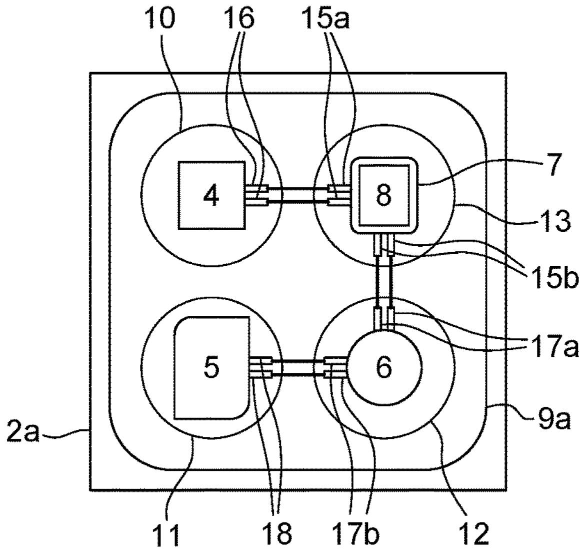
FIG. 4 shows a diagrammatic view of this first alternative embodiment of the assembly of layers forming the dial provided with the autonomous lighting device according to the embodiments of the invention.

In the first alternative embodiment illustrated in FIGS. 3 and 4, this assembly 9*a* comprises this fourth layer 13 forming the hidden face of the external timepiece element 2*a*. This fourth layer 13 is formed by a preferably flexible or pliable substrate comprising the control unit 7. Such a substrate can be, for example, a flexible PCB on which this control unit 7 is arranged, in particular on the upper surface of this PCB and thus of the substrate. In this context, the control unit 7 can be constructed on this upper surface of the substrate using three-dimensional printing processes or polymer printing processes.

In the second alternative embodiment, the assembly 9*b* forming the external timepiece element 2*b* comprises three interconnected layers 10, 11, 14. It should be noted that this second alternative embodiment differs from the first alternative embodiment in that it comprises three layers 10, 11, 14 instead of four layers 10, 11, 12, 13 as in the first alternative embodiment. In this second alternative embodiment, the electrical accumulator 6 of the autonomous lighting device 3 is now included in the third and last layer 14 of this assembly 9*b* with the control unit 7.

Such a third layer 14 forming the hidden face of the external timepiece element 2*b*, consists of a preferably flexible or pliable substrate, on which are built, preferably on the upper surface of this substrate, the accumulator 6 and the electronic circuit 8 constituting the control unit 7. The accumulator 6 and the control unit 7 can be built in this way on this upper surface of the substrate using three-dimensional printing processes or polymer printing processes. It should be noted that such a substrate can be, for example, a flexible PCB.

To summarise, in this second alternative embodiment, the assembly 9*b* thus comprises:

a first layer 10 forming the visible face 20*a* of the external timepiece element 2*b* including said at least one light source 4 of the lighting device 3;

a second layer 11 including the photovoltaic module 5, and the third layer 14 forming the hidden face 20*b* of the external timepiece element 2*b* including the accumulator 6 and the control unit 7.

It should be noted that in this second alternative embodiment, the first and second layers 10, 11 are similar to those of the first alternative embodiment of the assembly 9*a*.

Figure 6:
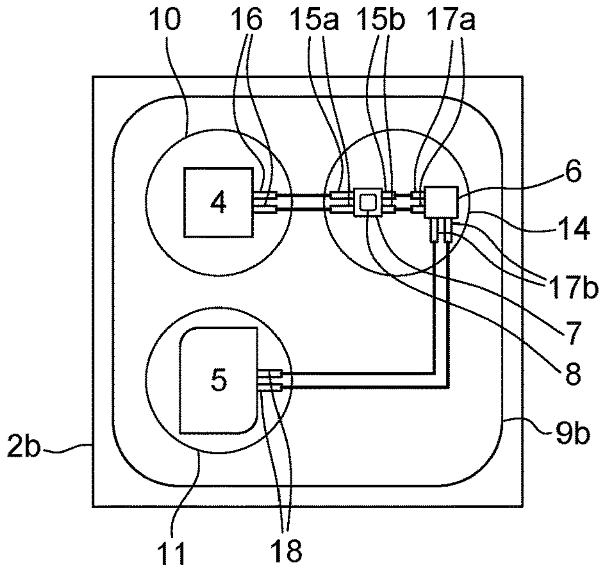
FIG. 6 shows a diagrammatic view of this second alternative embodiment of this assembly of layers forming the dial provided with the autonomous lighting device, according to the embodiments of the invention.

Furthermore, with reference to FIGS. 4 and 6, the electronic circuit 8 of the control unit 7 comprises first connection elements 15*a* which are connected to connection elements 16 of said at least one light source 4 for managing the operation of this light source 4. This electronic circuit 8 further comprises second connection elements 15*b* connected to first connection elements 17*a* of the accumulator 6. This accumulator 6 further comprises second connection elements 17*b* connected to connection elements 18 of the photovoltaic module 5.

It should further be noted that the above-mentioned event sensors of the lighting device 3 are preferably arranged in the first layer 10 and/or the last layer 13, 14 of the assembly 9*a*, 9*b* and are connected to the control unit 7 of this device 3.

In a third alternative embodiment not shown, the assembly forming the external timepiece element comprises two interconnected layers. It should be noted that this third alternative embodiment differs from the second alternative embodiment in that it comprises two layers instead of three layers 10, 11, 14 as in this second alternative embodiment. In this third alternative embodiment, the photovoltaic module 5 of the autonomous lighting device 3 is now included in the first layer and in particular on the lower surface of the substrate forming this first layer. This photovoltaic module 5 can be applied to this lower surface of the substrate of this first layer using inkjet or screen printing processes or using thermal evaporation printing processes. It should thus be noted that this first layer is thus similar to the first layers 11 of the first and second alternative embodiments, except that in this third alternative embodiment, the first layer additionally comprises the photovoltaic module.

Moreover, in the third alternative embodiment, and similarly to the second alternative embodiment, the electrical accumulator 6 of the autonomous lighting device 3 is included in the second and last layer of this assembly with the control unit 7. Such a second layer, forming the hidden face of the external timepiece element, consists of a preferably flexible or pliable substrate, on which are built, preferably on the upper surface of this substrate, the accumulator 6 and the electronic circuit 8 constituting the control unit 7. This accumulator 6 and the control unit 7 can be built in this way on the upper surface of the substrate using three-dimensional printing processes or polymer printing processes. It should be noted that such a substrate can be a flexible PCB for example.

To summarise, in this third alternative embodiment, the assembly thus comprises:

a first layer forming the visible face 20*a* of the external timepiece element including said at least one light source 4 and the photovoltaic module 5 of the lighting device 3, and a second layer forming the hidden face 20*b* of the external timepiece element including the accumulator 6 and the control unit 7.

It goes without saying that the present invention is not limited to the embodiments described above and that various simple modifications and alternative embodiments can be envisaged by a person skilled in the art without departing from the scope of the invention as defined by the appended claims.

The invention claimed is:

1. A timepiece comprising at least one external timepiece element comprising a visible face formed of at least a first opaque part and at least a second transparent or translucent part, said at least one external timepiece element comprising an autonomous lighting device comprising the following functional elements:

at least one light source capable of generating a light in the visible face of the external timepiece element;

a self-contained power supply unit; and a control unit configured to manage an operation of the light source;

said at least one external timepiece element being formed by an assembly of a plurality of stacked layers directly connected together and each comprising one or more functional elements of the autonomous lighting device, wherein the assembly of the plurality of stacked layers includes the self-contained power supply unit.

2. The timepiece according to claim 1, wherein the assembly includes a first layer forming said visible face comprising said at least one light source.

3. The timepiece according to claim 2, wherein said at least one light source is arranged in the first layer, said arrangement being configured so that most or all of the light produced by said at least one light source passes through said at least one second part of the visible face.

4. The timepiece according to claim 1, wherein said at least one second transparent or translucent part is configured so that light comprising solar radiation that can be received by a photovoltaic module of the self-contained power supply unit can pass therethrough.

5. The timepiece according to claim 3, wherein said at least one light source is a light source configured to produce continuous or quasi-continuous illumination on said at least one second part of the first layer.

6. The timepiece according to claim 2, wherein the assembly comprises, in addition to the first layer, successive layers including:

a second layer comprising a photovoltaic module constituting the self-contained power supply unit;

a third layer comprising an electrical accumulator constituting the self-contained power supply unit;

a fourth layer forming a hidden face of the external timepiece element comprising the control unit.

7. The timepiece according to claim 2, wherein the assembly comprises, in addition to the first layer, successive layers including:

a second layer comprising a photovoltaic module constituting the self-contained power supply unit, and a third layer having a hidden face of the external timepiece element comprising the control unit and an electrical accumulator constituting the self-contained power supply unit.

8. The timepiece according to claim 2, wherein the first layer is rigid relative to the other layers in the assembly, which are flexible.

9. The timepiece according to claim 1, wherein the plurality of layers are joined together by a connecting element so as to unify these layers to obtain an assembly forming a one-piece external timepiece element.

10. The timepiece according to claim 1, wherein said at least one first opaque part is a graphic representation included on and/or in a substrate used to help form the visible face.

11. The timepiece according to claim 1, wherein the functional elements are printed on substrates making up the layers of the assembly forming said at least one external timepiece element.

12. The timepiece according to claim 1, wherein said at least one external timepiece element comprises a back, a middle, a dial, a bracelet strand, a bezel, a flange, a push-button, a winding button and/or a winding button cap.

* * * * *